3,061,638
2-HYDROXYETHOXY-2'-BIPHENYLCARBOXYLIC ACID AND METHOD OF MAKING IT

John O. Hawthorne and Marcus S. Morgan, Pittsburgh, Pa., assignors to United States Steel Corporation, a corporation of New Jersey
No Drawing. Filed Apr. 4, 1960, Ser. No. 19,504
2 Claims. (Cl. 260—520)

This invention relates to the novel compound, 2-hydroxyethoxy-2'-biphenylcarboxylic acid and its preparation. The compound is useful in making synthetic resins as will be explained more fully later.

We have discovered that a derivative of 2,2'-biphenyl lactone, viz., a salt resulting from saponification thereof, will react with ethylene carbonate or ethylene oxide to give a new compound, 2-hydroxyethoxy-2'-biphenylcarboxylic acid, a useful component of polymerized resins, in good yield. The starting material is a product which is readily derived from phenanthrene, a low-cost coal chemical.

Aromatic phenol acids react readily with ethylene oxide or carbonate, in the presence of only catalytic amounts of a base, to form hydroxyethoxy carboxylic acids, but the same is not true of 2,2'-biphenyl lactone. We have found however that, when the lactone is saponified to a di-sodium salt, for example, the reaction with ethylene oxide or carbonate proceeds readily and results in a novel and useful compound, 2-hydroxyethoxy-2'-biphenylcarboxylic acid.

A complete understanding of our invention may be obtained from the following detailed explanation of typical examples of methods of preparing and utilizing our new compound.

Example I 2,2'-biphenyl lactone (5.88 grams; 0.03 mole) was refluxed with water (10 ml.) and sodium hydroxide (2.4 grams; 0.06 mole) until all the lactone was in solution. Then xylene (25 ml.) was added to the stirred aqueous solution. The suspension was refluxed, and the water was removed by collecting it in a Dean-Stark trap. The product, di-sodium salt of 2-hydroxy-2'-biphenylcarboxylic acid remained suspended in the xylene. The solid di-sodium salt was collected by filtration and dried at 110° C. The dry salt was placed in a flask and mixed with ethylene carbonate (50 grams) and stirred at 100° C. for one hour. At the end of that time, water (45 ml.) was added and the solution refluxed for 15 minutes. Ethanol (15 ml.) was added and the mixture refluxed 15 minutes more. Neutralization of the solution by carbon dioxide precipitated 1.38 grams of 2,2'-biphenyl lactone (9-oxa-9,10-dihydrophenanthrene-10-one). Acidification of the mother liquor after filtration precipitated 4.8 grams of 2-hydroxyethoxy-2'-biphenylcarboxylic acid melting in the range 118° C. to 121° C. The yield was 81% based upon 9-oxa-9,10-dihydrophenanthrene-10-one consumed (62% based on material charged). Following is the analysis of product:

|  | Calc. $C_{15}H_{14}O_4$ | Found |
|---|---|---|
| Carbon, percent | 69.75 | 68.71 |
| Hydrogen, percent | 5.47 | 5.57 |
| Neutral Equivalent | 258 | 256 |

Some variation from the foregoing procedure is possible. The amount of hydroxide may be from 2.4 to 3 grams and the amount of ethylene carbonate from 40 to 75 grams. Water must be carefully removed from the salt before reaction with the carbonate. The reactions involved in the process appear to be:

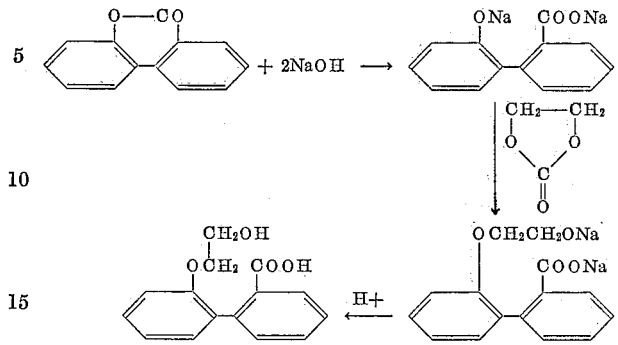

2,2'-biphenyl lactone (9-oxa-9,10-dihydrophenanthrene-10-one) is an internal phenolic ester. Sufficient base (2 molar equivalents) must be added to saponify this ester and thus form the derivative which is reactive toward ethylene oxide or carbonate, viz., the di-sodium salt of 2-hydroxy-2'-biphenylcarboxylic acid. The new compound, 2-hydroxyethoxy-2'-biphenylcarboxylic acid, being an alcohol-acid, is capable of intermolecular esterification to produce a polyester resin, as will be explained later.

Example II 2,2'-biphenyl lactone (9-oxa-9,10-dihydrophenanthrene-10-one) (5.88 grams) was dissolved in bis (2-ethoxyethyl) ether containing sodium hydroxide (2.4 grams) by heating at 130° C. for a few minutes. The resulting di-sodium salt of 2-hydroxy-2'-biphenylcarboxylic acid precipitated. Ethylene oxide was admitted into the stirred slurry at 115° C. at a rate of 200 ml./min. Unabsorbed gas was exhausted at an approximate rate of 25 ml./min. At the end of 20 minutes, water (10 ml.) was added and the solution allowed to stand for 10 minutes. The solution was then poured into water (300 ml.). The mixture (the solvent ether and water formed a two-phase system) was neutralized by carbon dioxide, and the solvent ether was extracted into diethyl ether. Acidification of the aqueous phase by hydrochloric acid to pH 1 precipitated 2-hydroxyethoxy-2'-biphenylcarboxylic acid, which was collected and dried (melting point 124 to 126° C). The yield was 2.8 grams (37% based upon the amount of lactone charged).

Evaporation of the diethyl ether from the bis-(2-ethoxyethyl) ether, followed by the addition of excess water to the bis-(2-ethoxyethyl) ether, precipitated 2,2'-biphenyl lactone. This material weighed 1.4 grams. Thus, the yield of 2-hydroxyethoxy-2'-biphenylcarboxylic acid, based upon the amount of lactone consumed, was 59%.

In the example just given, the hydroxide may vary from 2.4 to 3 grams and the ethylene oxide may vary from 2 to 4 liters (at standard conditions of temperature and pressure).

The utility of 2-hydroxyethoxy-2'-biphenylcarboxylic acid was demonstrated by including it in a polyester formulation and copolymerizing the polyester resin with styrene, by the following procedure.

2 - hydroxyethoxy - 2' - biphenylcarboxylic acid (7.0 grams), diethylene glycol (3.5 grams) and maleic anhydride (2.7 grams), were dissolved in xylene (20 ml.) by refluxing the mixture in a 100 ml. round-bottom flask fitted with a Dean-Stark water trap and condenser. After 24 hours of refluxing, the theoretical amount of water had been collected, and xylene was allowed to distill off until the pot temperature reached 200° C. This temperature was maintained for one hour; then the mixture was heated at 150 to 160° C. for one hour at a reduced pressure to remove excess xylene or diethylene glycol. A portion (9.5 grams) of the residue was mixed with styrene (5.5 grams) and benzoyl peroxide (0.15 gram). This mixture was molded into a disk approximately 1.5 inches in diameter and 3/16 inch thick. The disk was cured for 1.5 hours at 85° C., then for 2 hours at 110° C. A hardness test on this plastic gave an average Rockwell hardness, Scale H, of 85.6. Water absorption was determined by immersing the weighed plastic in 100 ml. of water for 24 hours at room temperature. The weight gain corresponded to 0.43 weight percent water absorption. Thus, the product was fairly hard, low in brittleness, and had a medium water-absorption value for such a material (0.1 to 0.9%).

While we have shown and described certain preferred practices of my invention, it is apparent that other modifications may arise. Therefore, we do not wish to be limited to the disclosure set forth but only by the scope of the appended claims.

We claim:
1. The compound, 2-hydroxyethoxy-2'-biphenylcarboxylic acid.

2. A method of making 2-hydroxyethoxy-2'-biphenylcarboxylic acid which comprises refluxing 2,2'-biphenyl lactone with about 2 moles of sodium hydroxide per mole of lactone thereby forming a disodium salt of 2-hydroxy-2'-biphenylcarboxylic acid, removing from the resulting mixture the water formed therein, treating the salt with a substantially equimolar quantity of a reagent selected from the group consisting of ethylene carbonate and ethylene oxide, then adjusting the pH of the resulting reaction product to precipitate 2-hydroxyethoxy-2'-biphenylcarboxylic acid.

References Cited in the file of this patent

Wittig et al., Chemical Abstracts, vol. 50, pp. 8678–8679 (1956), (2 pages).

I. L. Finar, Organic Chemistry, vol. I, p. 378 (1959), (1 page).

Derwent Belgian Patent Reports, vol. 55B, p. A14 (August 1959), (1 page).